United States Patent [19]

Muenchow et al.

[11] 4,276,247
[45] Jun. 30, 1981

[54] CYCLIC PEROXYKETAL CROSS-LINKING/BLOWING AGENTS FOR POLYETHYLENE

[75] Inventors: John R. Muenchow, Richmond; Ronald L. Pastorino, Larkspur; Reidar Halle, Novato; Roger N. Lewis, Martinez, all of Calif.

[73] Assignee: Argus Chemical Corporation, Brooklyn, N.Y.

[21] Appl. No.: 122,229

[22] Filed: Feb. 19, 1980

[51] Int. Cl.$^3$ .............................................. C08J 9/06
[52] U.S. Cl. ...................................... 264/54; 264/310; 264/DIG. 5; 264/DIG. 18; 521/87; 521/89; 521/90; 521/94; 521/96; 521/143
[58] Field of Search ..................... 521/90, 87, 96, 143; 264/54, 310, DIG. 5, DIG. 18

[56] References Cited

U.S. PATENT DOCUMENTS

| 3,470,119 | 9/1969 | Benning et al. | 521/96 |
| 3,608,006 | 9/1971 | Hosoda et al. | 521/96 |
| 3,640,919 | 2/1972 | Michels et al. | 521/96 |
| 3,965,054 | 6/1976 | Nojiri et al. | 521/96 |

Primary Examiner—Morton Foelak
Attorney, Agent, or Firm—Townsend and Townsend

[57] ABSTRACT

Novel processes and compositions are provided for the preparation of foamed, crosslinked polyethylene utilizing cyclic peroxyketal crosslinking/blowing agents. The novel compositions include esters of thiodipropionic acid as activators.

9 Claims, No Drawings

CYCLIC PEROXYKETAL CROSS-LINKING/BLOWING AGENTS FOR POLYETHYLENE

BACKGROUND OF THE INVENTION

1. Field of the Invention

The invention relates to certain cyclic peroxyketals useful as cross-linking/blowing agents and, in particular, to their use in compositions and processes for the preparation of foamed, cross-linked polyethylene.

2. Prior Art

It is known to form foamed, cross-linked polyethylene using chemical blowing agents by heating an expandable mixture comprising a thermoplastic resin such as polyethylene, a cross-linking agent and a chemical blowing agent. U.S. Pat. No. 3,470,119 teaches a method for manufacturing foamed polyethylene by use of a chemical blowing agent. U.S. Pat. No. 3,658,730 teaches a specific composition for blowing thermoplastic resins.

Chemical blowing agents (CBAs) are generally solid compounds or compositions which decompose at a specific temperature to yield a large volume of gas and a solid decomposition residue. Sodium bicarbonate, the most widely used inorganic CBA has limited use because it decomposes over a broad range of temperatures and because its decomposition point occurs at temperatures below those at which most resins, including polyethylene, are processed.

Organic CBA's tend to evolve gas over a more defined temperature range. Modern Plastics Encyclopedia 1979–1980, p. 186–188 teaches a group of known organic CBAs useful in the production of foamed, cross-linked polyethylene. The blowing composition of U.S. Pat. No. 3,658,731 utilizes azodicarbonamide, a known organic blowing agent, in conjunction with a chromium compound. The use of azobisformamide, p,p'-oxy-bis(-benzenesulfonyl hydrazide), diazoaminebenzene dinitrosopentamethylenetetramine, 4-nitro-benzene sulfonic acid hydrazine, β-naphthalene sulfonic acid hydrazide, diphenyl-4,4'-disulfonyl azide, and barium azodicarboxylate as blowing agents is taught in U.S. Pat. No. 3,470,119. A disadvantage with such azo blowing agents is the production of small amounts of ammonia which can corrode equipment.

The production of crosslinked polyethylene foams generally requires the use of cross-linking agents in addition to the blowing agent. An exception to the requirement of separate cross-linking and blowing agents is disclosed in U.S. Pat. No. 4,129,531 and U.S. Pat. No. 4,101,464 wherein certain azo esters function as cross-linking/blowing agents. However, as with other azo blowing compounds, small amounts of ammonia are produced.

Many organic peroxides, including cyclic peroxyketals, are known to be effective cross-linking agents for thermoplastic resins. U.S. Application Ser. No. 688,874, filed May 21, 1976 teaches nine-membered peroxyketals useful as cross-linking agents for polyethylene.

DESCRIPTION OF THE INVENTION

This invention relates to the novel use of certain cyclic peroxyketals as blowing agents to make foamed, cross-linked polyethylene, to novel expansible mixtures of polyethylene blended with both cyclic peroxyketal cross-linking/blowing agents and certain antioxidants which operate as activators and to novel processes for simultaneously or sequentially cross-linking and foaming polyethylene.

It has now been discovered that certain cyclic peroxyketals heretofore thought to be useful only as cross-linking agents can be utilized as blowing agents as well. Moreover, the use of the cyclic peroxyketal cross-linking/blowing agents in the compositions and processes of the present invention results in cross-linked polyethylene foam with good color and improved heat stability without the formation of corrosive by-products.

In particular, the present invention relates to the use of cyclic peroxyketals which provide the dual function of cross-linking and blowing agents. The cross-linking/blowing agents of the present invention are organic peroxides of the formula:

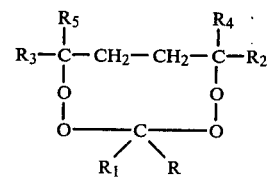

wherein each of $R_2$, $R_3$, $R_4$ and $R_5$ is selected from alkyl having 1–4 atoms, e.g. methyl, ethyl; each of R and $R_1$ is selected from alkyl, hydroxyalkyl, such as 2-methyl-2-hydroxypropyl, alkyl carboxylate ester groups of up to about 10 carbon atoms in which either the acid or alcohol moiety, preferably the acid moiety, is bonded to the ring carbon atom,

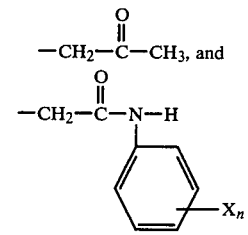

wherein n is 0 to 3 and X is lower alkyl or alkoxy of up to 5 carbon atoms. The cyclic peroxyketals useful in the present invention are those described and prepared in accordance with the teachings of Ser. No. 688,874, filed May 21, 1976.

The cyclic peroxyketals of the present invention decompose at temperature ranges at which polyethylene is conveniently molded, typically in the range of 150° to 250° C., to yield carbon dioxide gas and decomposition residues which are compatible with foamed, crosslinked polyethylene. The gas yield upon decomposition is sufficient to create a foam when the cyclic peroxyketals are utilized as blowing agents according to the present invention. The amount of gas evolution is generally determined by the temperature and time.

The decomposition of the cyclic peroxyketal cross-linking/blowing agents of the instant invention may be promoted by the addition of certain activators. In particular, it has been found that certain known antioxidants, such as those described in U.S. Pat. No. 3,876,613, function in a dual capacity as activators and antioxidants.

Novel expansible compositions from which our foamed, cross-linked polyethylene is prepared comprise polyethylene, a cyclic organic peroxide as described above and an anti-oxidant/activator which is an ester of thiodipropionic acid.

The process of the present invention comprises the steps of providing an expansible mixture comprising polyethylene and an effective amount, typically 0.10–10% by weight of the polyethylene, of an organic peroxide cross-linking/blowing agent; heating said mixture by conventional means to crosslink said polyethylene; and expanding said mixture to a volume greater than the initial volume of the mixture whereby the density of the polyethylene is reduced, typically by about 30 percent or more.

In one embodiment, the mixture also includes an effective amount, typically 0.05 to 0.50 weight percent of an ester of thiodipropionic acid which acts as both an antioxidant for the foamed, crosslinked polyethylene and as a promoter or activator of the cyclic organic peroxide.

The antioxidants/activators useful in the composition and processes of the present invention are esters of thiodipropionic acid having the formula:

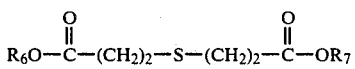

wherein $R_6$ and $R_7$ are selected from the group consisting of alkyl, alkenyl, aryl, and cycloalkyl hydrocarbon radicals and combinations thereof such as alkaryl, aralkyl and alkylcycloalkyl, having up to 22 carbon atoms and wherein at least one R has at least 10 carbon atoms per molecule.

Some suitable R radicals include for example, methyl, ethyl, propyl, isopropyl, butyl, isobutyl, t-butyl, amyl, isoamyl, n-octyl, isooctyl, 2-ethyl hexyl, t-octyl, decyl, dodecyl, octadecyl, allyl, hexenyl, linoleyl, ricinoleyl, lauryl, stearyl, myristyl, oleyl, phenyl, xylyl, tolyl, ethylphenyl, naphthyl, cyclohexyl, benzyl, cyclopentyl, methylcyclohexyl, ethylcyclohexyl, and naphthenyl.

Some examples of suitable thiodipropionic acid esters include, for example, butyl stearyl thiodipropionate, diisodecyl thiodipropionate, isodecyl phenyl thiodipropionate, benzyl lauryl thiodipropionate, the diester of mixed coconut fatty alcohols and thiodipropionic acid, the diester of mixed tallow fatty alcohols and thiodipropionic acid, the diester of mixed cottonseed oil fatty alcohols and thiodipropionic acid, the diester of mixed soybean oil fatty alcohols and thiodipropionic acid.

A presently preferred group of esters of thiodipropionic acid in which each of $R_6$ and $R_7$ has 12–20 carbon atoms, more preferably esters in which both $R_6$ and $R_7$ are the same, include the dilauryl, distearyl, dimyristyl, dioleyl and diricinoleyl esters.

Perferably the amount of the ester is in the range of 0.02–0.5 weight percent based on the weight of the solid polymer. More often the amount is in the range of 0.05–0.10 weight percent which range includes amounts which have been found to give good results.

Polyethylene foam products having high impact strength at low temperature can also be obtained when a phenolic antioxidant is incorporated into the polymer in addition to the ester of thiodipropionic acid of the present invention. Amounts of the phenolic antioxidant, such as Toponol CA, up to about 0.5 percent by weight, preferably up to about 0.1 percent by weight can be utilized with good results.

The esters of thiodipropionic acid useful in the present invention are known to be useful as anti-oxidants for polyethylene. To avoid a change of properties upon extended exposure to heat, such antioxidants are incorporated into the polyethylene composition prior to molding thereby stabilizing the molded polyethylene articles during and after the molding process. In general, for normal temperature operation many stabilizing antioxidants can be used. However, many antioxidants have a negative effect upon low temperature impact strength and it is known that good low temperature impact strength can be obtained by using the esters of thiodipropionic acids herein described.

However, in addition to acting in their known capacity of antioxidants, when utilized according to the present invention the esters of thiodipropionic acid serve a second function as activators for the organic peroxide crosslinking/blowing agents in that they promote the decomposition of such peroxides.

In accordance with the present invention the cyclic peroxyketal crosslinking/blowing agents described are blended with polyethylene. The polyethylene useful in the novel compositions and processes of the present invention may be low, medium or high density polyethylene as described in Modern Plastics Encyclopedia (1978–1979). By high density polyethylene (HDPE) is meant substantially linear polyethylene, i.e. having few side chains and a density of greater than about 0.958 g/cc. By medium density polyethylene (MDPE) is meant polyethylene with short side chains and a density of from about 0.940 to about 0.955 g/cc. By low density polyethylene is meant branched-chain polyethylene having a density of from about 0.910 to about 0.935 g/cc.

As will be known and understood by those in the art the polyethylene useful in the present invention may contain varying quantities of other comonomers such as 1-butene, 1-hexene and propylene.

Incorporation of the cross-linking/blowing agents may be effected by a variety of techniques known in the art including dry tumbling, liquid dispersion of the organic peroxides and pelletized concentrates of the organic peroxides. Each of these techniques is described in more detail in Modern Plastics Encyclopedia 1979–1980, page 188.

Once the mixing of the polyethylene and the cross-linking/blowing agent is completed, the mixture is molded by conventional means under conditions which allow expansion of the foam, including heating to a temperature sufficient to cross-link and foam the polyethylene, usually within a preferred range of 150°–250° C. Typically, the mixture is heated to a temperature sufficient to effect cross-linking and foaming in the absence of applied pressure or substantially at atmospheric pressure in a mold having a volume greater than the initial volume of the mixture and the mixture expands to fill the mold volume. The cross-linking and foaming may occur simultaneously or sequentially. The resultant foamed or expanded polyethylene, having increased in volume, will typically have a reduction in density of at least 30 percent as compared to the starting density of the polyethylene. Where a foamed article of a particular shape is desired, the step of mixing the polyethylene and the cross-linking/blowing agent may be followed by shaping the mixture into the desired form.

The expansible mixtures of the present invention may be foamed by a variety of conventional methods. For example, foamed polyethylene blocks, or articles may be prepared by introducing a volume of mixture into a mold having a larger total volume and heating the mixture within the mold to at least 150° C. whereby the polyethylene is cross-linked and expands into and fills the mold. The foamed polyethylene blocks may then be set by cooling. In another embodiment the expansible mixture may be introduced into a mold of substantially the same volume. The mixture in the mold is then heated to at least 150° C. to initiate cross-linking and foaming. As the pressure within the mold increases the volume of the mold may be increased, as by separating the sides, thereby allowing the foam to gradually expand with the mold. Alternatively, the expansible mixture may be heated in a mold of substantially the same volume to at least 150° C. for a period of time sufficient to initiate crosslinking, followed by a release of pressure thereby allowing the polyethylene to expand. The heating may be carried out under an initially applied pressure or the pressure may increase from initially atmospheric pressure conditions due to the $CO_2$ released during the decomposition of the cross-linking/blowing agent. In another embodiment sheet like polyethylene may be turned into foamed sheet continuously by heating it on a wire-net conveyor in a hot air oven.

The amount of pure cross-linking/blowing agent may vary depending on the density of the starting polyethylene, the temperature and the degree of foaming, i.e. expansion, desired, but will usually be in the range of from about 0.010–10%, more typically 0.50–5.0% by weight of the polyethylene. Similarly, as will be known and understood by those skilled in the art the process steps followed in the practice of the present invention can be varied depending on the type of polyethylene utilized, the density of foam desired, and the degree of crosslinking desired.

In a preferred embodiment the heating for purposes of simultaneously or sequentially foaming and cross-linking the polyethylene is applied during the procedure known as rotational molding. Rotational molding is a process intended primarily for the manufacture of hollow objects. In this process the solid or liquid polymer is placed in a mold; the mold is first heated and then cooled while being rotated about two perpendicular axes simultaneously. During the first portion of the heating stage when molding powdered material, a porous skin is formed on the mold surface. This gradually melts as the cycle progresses to form a homogenous layer of uniform thickness. However, when molding a liquid material, it tends to flow and coat the mold surface until the gel temperature of the resin is reached, at which time all flow ceases. The mold is then indexed into a cooling station, where forced air, water spray or a combination of both cool the mold. It is then positioned in a work zone, where the mold is opened, the finished part removed and the mold recharged for the following cycle. Centrifugal force rather than applied pressure is utilized during rotational molding. For more details as to various techniques and apparatus used in rotational molding see Kravity and Heck, "Now's The Time To Look Into Foam Rotational Molding", Plastics Technology, October 1979, p. 63–66.

The following experimental work is designed to show the satisfactory results obtained by the processes and compositions of the present invention.

EXPERIMENTAL PROCEDURES

The resin mixture was prepared by dry blending the peroxide and the antioxidant together into 30 g of MDPE powder for about 5 minutes. The resin used was Phillips Marlex TR880 with a density of 0.955 and a melt index of 18. Platen temperatures on the press were checked with a surface pyrometer and were either 200° C. or 240° C. Molding time was 15 minutes.

The resin mixture was spread evenly over the lower platen, which had been covered with aluminum foil. Another sheet of aluminum foil was placed on top of the resin mixture. The platens were then gently brought together (about 4 mm apart) with very little, if any, ram pressure applied. At the end of the molding cycle, the ram pressure indicated on the press gauge was approximately 1000 lbs. The molded specimen was then released and cooled quickly in water. Each molded specimen had the aluminum foil peeled off before any evaluations were performed.

To determine the percent weight gel, approximately 0.3000 g sample was cut into 6–7 pieces and placed inside a stainless steel screen pouch. These pouches were extracted in 2 liters of boiling xylene containing 10 g of Plastanox 2246 antioxidant for 16 hours and then dried in an oven at 170° C. for 4 hours.

The %wt gel was calculated by the following formula:

$$\% \text{ wt gel} = \frac{W_1 - (W_2 - W_3)}{W_1} - 0.0036 \times 100$$

where:
$W_1$ = wt. of sample, g
$W_2$ = wt. of sample + pouch, g
$W_3$ = wt. of sample + pouch after extraction, g
0.0036 = blank value for resin without peroxide.

Densities were determined by ASTM 1622-63, "Apparent Density of Rigid Cellular Plastics". The procedure is to cut out rectangles of the cross-linked foamed specimens and measure as accurately as possible their length, width, and thickness with a dial caliper. The volume can then be calculated. The density was found by dividing the weight of each rectangle by its volume.

Heat stability tests were done by cutting out 1 cm × 2 cm rectangles of the cross-linked foamed specimens and placing them in an oven at 140° C. and observing the color change with time.

The cyclic peroxides listed in Table I were prepared by reacting the designated starting ketone with 2,5-dimethyl-2,5-dihydroperoxyhexane according to the experimental procedures described in Ser. No. 688,874 filed May 21, 1976.

TABLE I

PEROXIDES USED TO MAKE CROSSLINKED MDPE FOAMS

Peroxide 1. 2,5-Dimethyl-2,5-Di(t-Butyl Peroxy) Hexyne-3 (Hexyne Dialkyl I)
2. Cyclic Peroxyketals made from 2,5-Dimethyl-2,5-Dihydroperoxy Hexane

TABLE I-continued
PEROXIDES USED TO MAKE CROSSLINKED MDPE FOAMS $$\text{H}_3\text{C}-\underset{\underset{\underset{O-\underset{R_1}{\overset{}{\diagdown}}\overset{}{C}\overset{CH_3}{\diagup}-O}{O}}{O}}{\overset{CH_3}{\overset{|}{C}}}-\text{CH}_2-\text{CH}_2-\underset{\underset{O}{\overset{|}{O}}}{\overset{CH_3}{\overset{|}{C}}}-\text{CH}_3$$

3,6,6,9,9-Pentamethyl-3R$_1$-1,2,4,5-Tetraoxacyclononane

| Cyclic Peroxyketal | Starting Ketone | R$_1$ Group |
|---|---|---|
| A | Ethyl Acetoacetate | $-\text{CH}_2-\overset{\overset{O}{\|}}{C}-\text{OC}_2\text{H}_5$ |
| B | Methyl n-Butyl Ketone | n-butyl |
| C | Methyl n-Propyl Ketone | n-propyl |
| D | n-Butyl Levulenate | $-\text{CH}_2-\text{CH}_2-\overset{\overset{O}{\|}}{C}-\text{OC}_4\text{H}_9$ |
| E | Acetal Acetate | $-\text{CH}_2-\text{O}-\overset{\overset{O}{\|}}{C}-\text{CH}_3$ |
| F | n-Butyl 2-Oxopropyl Carbonate | $-\text{CH}_2-\text{O}-\overset{\overset{O}{\|}}{C}-\text{OC}_4\text{H}_9$ |

TABLE II
DENSITIES AND PERCENT GELS OF CROSSLINKED MDPE FOAMS USING AZODICARBONAMIDE AS THE BLOWING AGENT

| TEST | Foaming Temp., °C. | phr Peroxide | phr Blowing Agent | Foam Density (g/cm$^3$)* | % Wt. Gel |
|---|---|---|---|---|---|
| 1. | 200 | 1.5 | — | 0.815 | 98.5 |
| 2. | 200 | 0.5 | 1.0 | 0.519 | 55.5 |
| 3. | 200 | 0.5 | 5.0 | 0.576 | 50.1 |
| 4. | 200 | 1.0 | 1.0 | 0.779 | 95.9 |
| 5. | 200 | 1.0 | 5.0 | 0.728 | 88.9 |
| 6. | 200 | 1.0 | 10.0 | 0.742 | 86.6 |
| 7. | 240 | 1.5 | 1.0 | 0.653 | 97.7 |
| 8. | 240 | 1.5 | 5.0 | 0.634 | 83.0 |
| SET B - Cyclic Peroxyketal A | | | | | |
| 1. | 200 | 1.5 | — | 0.477** | 89.2** |
| 2. | 200 | 1.5 | 5.0 | 0.642 | 5.9 |
| 3. | 240 | 1.5 | 1.0 | 0.558 | 31.7 |
| 4. | 240 | 1.5 | 5.0 | 0.504 | 10.1 |

*The procedure used was ASTM 1622-6B, "Apparent Density of Rigid Cellular Plastics".
**Average values from 3 tests.

In the above Tables I and II, 2,5-dimethyl-2,5-di(t-butylperoxy)hexyne-3, hereinafter referred to as hexyne dialkyl I, is included for comparison because it is the preferred commercial peroxide used for preparing crosslinked MDPE and HPDE. Table II shows the testing results on foamed, cross-linked medium density polyethylene (MDPE) utilizing azodicarbonamide, the most commonly used organic chemical blowing agent and either hexyne dialkyl I or cyclic peroxide A from Table I as the cross-linking agent. The results indicate the use of the combination of hexyne dialkyl I/azodicarbonamide is not as effective as cyclic peroxide A alone. Moreover, cyclic peroxide A alone produced a foam with higher % wt gel and lower density than when used as the cross-linking agent in conjunction with the known blowing agent.

Table III demonstrates the advantageous results obtained with the use of esters of thiodipropionic acid as activators compared to the use of other known antioxidants. A comparison of Test #1 and Test #4 shows a density reduction (enhanced foaming) without any loss in % gel was achieved by the use of distearylthiodipropionate (DSTDP) in conjunction with cyclic peroxide A than by the use of cyclic peroxide A alone. Other types of antioxidants tested results in insignificant or no reduction in density. Test #13 demonstrates that DSTDP is not an activator for hexyne dialkyl I.

The use of zinc oxide (ZnO), a nucleating agent, with cyclic peroxyketal A alone or in combination with DSTDP is presented in Table IV. Nucleating agents aid in obtaining a foam with a more uniform cell size. The use of ZnO in known quantities does not reduce either the foam density or the % wt. gel, and thus appears to overpower the activator, DSTDP. As will be known and/or understood by those in the art, it is contemplated within the scope of the invention that it may nevertheless be useful to incorporate small amounts, such as 0-5 parts by weight, of nucleating agents such as ZnO.

Similarly other ingredients which do not adversely affect the molding, or the cross-linking or foaming of the polyethylene and which do not impart undesirable characteristics to the foam products can be added to the mixture. Examples of such materials which may be added under suitable conditions and in suitable amounts include pigments, stabilizers, anti-static agents, ultraviolet absorbers for light stabilization, fillers, reinforcing materials, etc. The only requirement for such additives is that they be compatible with the specific composition to permit proper molding, crosslinking and foaming to obtain well formed products and molded articles having the desired properties.

TABLE III

DENSITIES AND PERCENT GELS OF CROSSLINKED MDPE FOAMS
Using 1.5 phr Cyclic Peroxyketal A at 200° C. and 15 Minutes Molding Time

| TEST | ANTIOXIDANT (Activator) | phr | Foam Density (g/cm³) | % Wt. Gel |
|---|---|---|---|---|
| 1. | — | — | 0.477[1] | 89.2[1] |
| 2. | DSTDP[2] | 0.05 | 0.400 | 93 |
| 3. | DSTDP | 0.10 | 0.369[3] | 80.4[3] |
| 4.[4] | DSTDP | 0.10 | 0.340 | 91.8 |
| 5. | DSTDP | 0.30 | 0.411 | 26.2 |
| 6. | DLTDP[5] | 0.10 | 0.394 | 80.8 |
| 7. | Mark 328[6] | 0.10 | 0.385 | 91.1 |
| 8. | Topanol CA | 0.10 | 0.440 | 92.8 |
| 9. | Mark 1589[7] | 0.10 | 0.433 | 93.9 |
| 10. | Mark 2112[8] | 0.10 | 0.503 | 93.0 |
| 11. | Santonox R[9] | 0.10 | 0.452[10] | 68.5[10] |
| 12. | Santonox R | 0.20 | 0.591 | 37.4 |
| 13. 1.0 phr DSTDP Hexyne Dialkyl I | | 0.10 | 0.847 | 98.3 |

[1]Average values from three tests
[2]Distearyl Thiodipropionate
[3]Average value from four tests
[4]Mold temperature was 240° C.
[5]Dilauryl Thiodipropionate
[6]6 Parts DSTDP to one part Topanol CA (a phenolic type antioxidant)
[7]A phenolic type antioxidant
[8]A phosphite type antioxidant
[9]A thio bis alkylated phenol type antioxidant
[10]Average values from two tests

TABLE IV

DENSITIES AND PERCENT GELS OF CROSSLINKED MDPE FOAMS
Using 1.5 phr Cyclic Peroxyketal A at 200° C. and 15 Minutes Molding Time With Both Activator and Nucleating Agent

| TEST | ANTIOXIDANT (Activator) | phr | NUCLEATING AGENT | phr | FOAM DENSITY (g/cm³) | % WT. GEL |
|---|---|---|---|---|---|---|
| 1. | — | — | — | — | 0.477 | 89.2 |
| 2. | DSTDP | 0.10 | — | — | 0.369 | 80.4 |
| 3. | — | — | ZnO | 5.0 | 0.477 | 90.9 |
| 4. | DSTDP | 0.10 | LnO | 5.0 | 0.457 | 86.4 |

The other cyclic peroxides of Table I were used as crosslinking/blowing agents for MDPE. The results are given in Table V and demonstrate utility. Moreover, a comparison with Test #2 of Set A in Table II, the best test using commercially available products, demonstrates that in several instances the results obtained from the compositions of the present invention are far superior to those obtained by compositions utilizing the known blowing agent.

In Table VI, heat stabilities of crosslinked polyethylene foams made with either cyclic peroxyketal A alone or in combination with examples of the preferred antioxidant/activators are compared to non-foamed crosslinked polyethylene made with hexyne diakyl I alone on in combination with one of the antioxidant systems. Similar results were obtained with both Sets A and B.

TABLE V

DENSITIES AND PERCENT GELS OF CROSSLINKED MDPE FOAMS
Using 1.5 phr Other Cyclic Peroxyketals and 0.1 phr DSTDP at 200° C. and 15 Minutes

| TEST | CYCLIC PEROXYKETAL | FOAM DENSITY (g/cm³) | % WT. GEL |
|---|---|---|---|
| 1. | B | 0.530* | 15.3* |
| 2.** | B | 0.524 | 91.6 |
| 3. | C | 0.524 | 23.6 |
| 4. | D | 0.627 | 2.4 |
| 5. | E | 0.310 | 92.6*** |
| 6.** | E | 0.402 | 88.0 |
| 7. | F | 0.479 | 93.5*** |
| 8.** | F | 0.425 | 94.4 |

*Average values from 2 tests.
**Mold temperature was 240° C.
***Average values from 2 determinations on the same specimen.

TABLE VI

HEAT STABILITY TESTS AT 140° C. ON SELECTED CROSSLINKED SPECIMENS
Molded for 15 Minutes at 200° C.

| | | COLOR AFTER AGING AT 140° C.* | | | | | |
|---|---|---|---|---|---|---|---|
| SAMPLE | Days | 1 | 2 | 3 | 6 | 8 | 10 |
| Set A - Made with 1 phr Hexyne Dialkyl I (Nonfoamed) 0.1 phr Antioxidant | | | | | | | |
| 1. — | | y | y | dy | vdy | b | b |
| 2. Mark 328 | | ly | ly | y | dy | dy | dy |
| Set B - Made with 1.5 phr Cyclic Peroxyketal A (Foamed) 0.1 phr Antioxidant | | | | | | | |
| 3. — | | y | y | dy | vdy | b | b |
| 4. DSTDP | | w | w | ly | dy | b | b |
| 5. Mark 328 | | w | w | ly | dy | dy | b |
| 6. 0.2 phr Mark 328 | | w | w | w | ly | y | y |

*Color Legend:
w = white
ly = light yellow
y = yellow
dy = dark yellow
vdy = very dark yellow
b = brown

What is claimed is:

1. A method for making foamed, crosslinked polyethylene comprising: mixing polyethylene with about 0.10–10% by weight of a crosslinking/blowing agent of the formula:

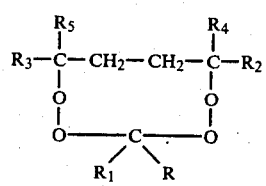

wherein each of $R_2$, $R_3$, $R_4$ and $R_5$ is selected from alkyl having from 1–4 carbon atoms; each of R and $R_1$ is selected from alkyl, hydroxy alkyl and alkyl carboxylate ester groups having up to about 10 carbon atoms,

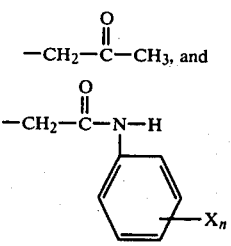

where $n=0$ to 3 and X is lower alkyl or alkoxy of up to about 5 carbon atoms; and heating said mixture to a temperature sufficient to crosslink and foam said polyethylene under conditions which permit expansion of the polyethylene.

2. A method according to claim 1 wherein said step of mixing further comprises mixing an antioxidant/promoter of the formula:

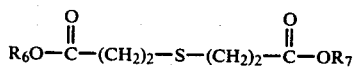

wherein $R_6$ and $R_7$ are selected from the group consisting of alkyl, alkenyl, aryl, cycloalkyl, hydrocarbon radicals and combinations thereof and wherein at least one of $R_6$ and $R_7$ has at least 10 carbon atoms.

3. A method according to claim 2 wherein R, $R_2$, $R_3$, $R_4$ and $R_5$ are each methyl, $R_1$ is alkyl of 1–4 carbon atoms or an alkyl carboxylate ester group having up to 10 carbon atoms and $R_6$ and $R_7$ are each alkyl of from 10–25 carbon atoms, and said step of heating is at a temperature of at least 150° C.

4. A method according to claim 1 wherein said mixture is simultaneously crosslinked and foamed.

5. A method according to claim 1 wherein said heating is under pressure and further comprising the step of releasing said pressure whereby said foam is allowed to expand.

6. A method for producing foamed, crosslinked polyethylene articles comprising the steps of
mixing polyethylene with about 0.10–10% by weight of an organic peroxide of the formula:

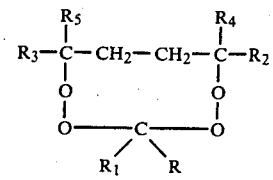

wherein each of $R_2$, $R_3$, $R_4$ and $R_5$ is selected from alkyl having from 1–4 carbon atoms; each of R and $R_1$ is selected from alkyl, hydroxy alkyl and alkyl carboxylate ester groups having up to about 10 carbon atoms,

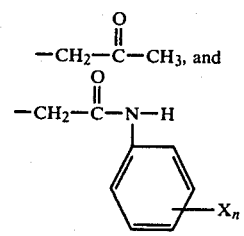

where $n=0$ to 3 and X is lower alkyl or alkoxy of up to about 5 carbon atoms; shaping said mixture comprising said polyethylene and said organic peroxide in a mold; heating said mixture to a temperature sufficient to foam and cross-link said polyethylene; and expanding said mixture.

7. A method according to claim 6 wherein said mold has a volume greater than the volume of said mixture and said mixture expands into said mold volume.

8. A method according to claim 6 wherein said mixture substantially fills said mold; said heating is under pressure; and further comprising releasing said pressure whereby said mixture expands.

9. In a method for producing hollow, foamed polyethylene articles by rotationally molding a composition comprising polyethylene of a density greater than 0.925 g/cc blended with a blowing agent under conditions which permit expansion of said composition, the improvement comprising utilizing as said blowing agent an organic peroxide of the formula:

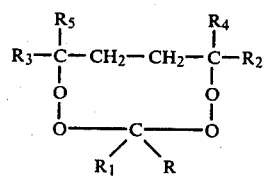

wherein each of $R_2$, $R_3$, $R_4$ and $R_5$ is selected from alkyl having from 1–4 carbon atoms; each of R and $R_1$ is selected from alkyl, hydroxy alkyl and alkyl carboxylate ester groups having up to about 10 carbon atoms,

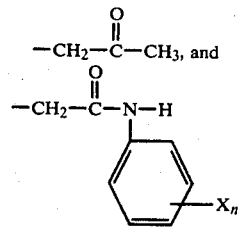

where $n=0$ to 3 and X is lower alkyl or alkoxy of up to about 5 carbon atoms.

* * * * *